United States Patent
Gagas et al.

(10) Patent No.: US 10,978,949 B2
(45) Date of Patent: Apr. 13, 2021

(54) METHOD AND APPARATUS FOR CONTROLLING A DC/DC POWER CONVERTER

(71) Applicant: GM Global Technology Operations LLC, Detroit, MI (US)

(72) Inventors: Brent S. Gagas, Ferndale, MI (US); Brian A. Welchko, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/406,609

(22) Filed: May 8, 2019

(65) Prior Publication Data

US 2020/0358359 A1 Nov. 12, 2020

(51) Int. Cl.
*H02M 3/158* (2006.01)
*H02M 1/08* (2006.01)
*H02M 1/00* (2006.01)

(52) U.S. Cl.
CPC ........... *H02M 3/1584* (2013.01); *H02M 1/08* (2013.01); *H02M 2001/0009* (2013.01); *H02M 2003/1586* (2013.01)

(58) Field of Classification Search
CPC ............ H02M 3/02; H02M 3/04; H02M 3/10; H02M 3/135; H02M 3/137; H02M 3/139; H02M 3/142; H02M 3/155; H02M 3/156; H02M 3/1563; H02M 3/157; H02M 3/158; H02M 3/1582; H02M 3/1584; H02M 3/1588; H02M 1/14; H02M 1/143; H02M 1/15; H02M 1/08; H02M 1/081; H02M 1/082; H02M 1/084; H02M 1/0845; H02M 1/088; H02M 2001/0009; H02M 2001/0012; H02M 2001/0016; H02M 2001/0019; H02M 2001/0025; H02M 2001/0067; H02M 2003/1552; H02M 2003/1566; H02M 2003/1586
USPC ........ 323/212–219, 222–226, 266, 268, 269, 323/271–275, 277, 282–285, 351; 363/65
See application file for complete search history.

(56) References Cited

U.S. PATENT DOCUMENTS

| | | | |
|---|---|---|---|
| 8,710,810 B1 * | 4/2014 | McJimsey | H02M 3/1584 323/272 |
| 2016/0149501 A1 * | 5/2016 | Dai | H02M 3/07 363/21.02 |

* cited by examiner

*Primary Examiner* — Thienvu V Tran
*Assistant Examiner* — Carlos O Rivera-Perez
(74) *Attorney, Agent, or Firm* — Quinn IP Law

(57) ABSTRACT

A DC-DC power converter including switched inductance circuits arranged in parallel is described. Operation includes determining a commanded current and activation commands for the switched inductance circuits based upon the commanded current. This includes executing the activation commands and monitoring current in the switched inductance circuits. An average measured current is determined for each of the switched inductance circuits, and a modified activation command is determined for each of the switched inductance circuits based upon the average measured current. A time portion of the modified activation command that exceeds an end time point of a subsequent time period is determined, and the modified activation commands for the switched inductance circuits are executed, including forward-shifting that time portion of the modified activation command for each of the switched inductance circuits that exceeds the end time point.

16 Claims, 3 Drawing Sheets

METHOD AND APPARATUS FOR CONTROLLING A DC/DC POWER CONVERTER

INTRODUCTION

Multi-phase direct current-to-direct current (DC-DC) power converters, such as boost converters, operate to increase or boost an input voltage level to an elevated output voltage level employing multiple phases. The input voltage may originate from a DC power source, and the output voltage may be supplied to a high-voltage electric power bus. Such DC-DC converters may be employed to supply electric power to electric motors for efficient operation of an inverter and an electric motor. Also, such DC-DC power converters can be used between multiple power storage devices to match the voltages thereof.

A DC-DC power converter may operate in conjunction with a power capacitor in order to reduce current ripple, and a multi-phase DC-DC power converter may be employed to reduce magnitude of the current ripple, which may facilitate reducing the size of the power capacitor. Multi-phase DC-DC power converters may require current balancing to achieve reduced current ripple and to balance the electric power load evenly among the multiple phases so as to not stress the devices of one or another of the phases.

Accordingly, it is desirable to provide a method and apparatus for balancing the currents of each phase of a multi-phase DC-DC power converter in order to reduce a size of a capacitor and to minimize component stress. Other desirable features and characteristics of the present disclosure will become apparent from the subsequent detailed description and the appended claims, taken in conjunction with the accompanying drawings and the foregoing technical field and background.

SUMMARY

A DC-DC power converter is described, and includes a plurality of switched inductance circuits arranged in parallel, a plurality of current sensors, each disposed to monitor one of the switched inductance circuits, and a controller. The controller is in communication with each of the current sensors and operatively connected to each of the switched inductance circuits. The controller includes an instruction set that is executable to determine a commanded current, and determine activation commands (also known as PWM duty cycle) for the switched inductance circuits based upon the commanded current. Operation includes executing, during a first time period, the activation commands for the switched inductance circuits and concurrently monitoring current in each of the switched inductance circuits wherein selected ones of the activation commands are phase-shifted. During a second time period, an average measured current is determined for each of the switched inductance circuits based upon the average measured current for the respective switched inductance circuit, and a modified activation command is determined for each of the switched inductance circuits based upon the average measured current for the respective switched inductance circuit. For each of the switched inductance circuits, a time portion of the modified activation command that exceeds an end time point of a third, subsequent time period is determined, and during the third time period, the modified activation commands for the switched inductance circuits are executed, including forward-shifting that time portion of the modified activation command for each of the switched inductance circuits that exceeds the end time point of the third time period.

An aspect of the disclosure includes the instruction set executable to initiate, at a beginning time point of the third time period, that time portion of the modified activation command that exceeds the end time point of the third time period.

Another aspect of the disclosure includes the controller including a shared current regulator arranged to command operation of each of the plurality of switched inductance circuits, wherein the shared current regulator is operable to determine, during a second time period a modified activation command for each of the switched inductance circuits based upon the average measured current for the respective switched inductance circuit.

Another aspect of the disclosure includes the DC-DC power converter being a fixed-frequency DC-DC power converter, and wherein the first, second and third time periods are consecutive time periods having equivalent elapsed times.

Another aspect of the disclosure includes the DC-DC power converter being a boost converter configured to step up the voltage level of electric power from the DC power source that is supplied to a high-voltage bus.

Another aspect of the disclosure includes the DC-DC power converter being a multi-phase interleaved DC-DC power converter.

Another aspect of the disclosure includes the DC-DC power converter being arranged to receive an electric power input from a DC electric power source at a first current level and supply electric power to a high-voltage bus at a second current level.

Another aspect of the disclosure includes the DC power source being one of a fuel cell, an ultracapacitor, or a high-voltage DC battery.

Another aspect of the disclosure includes the switched inductance circuits being arranged in parallel with a capacitor, and wherein the capacitor is arranged in parallel with first and second lines of a high-voltage DC bus.

Another aspect of the disclosure includes each of the switched inductance circuits including an inductor connected to a node in between a switch arranged in series with a diode.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
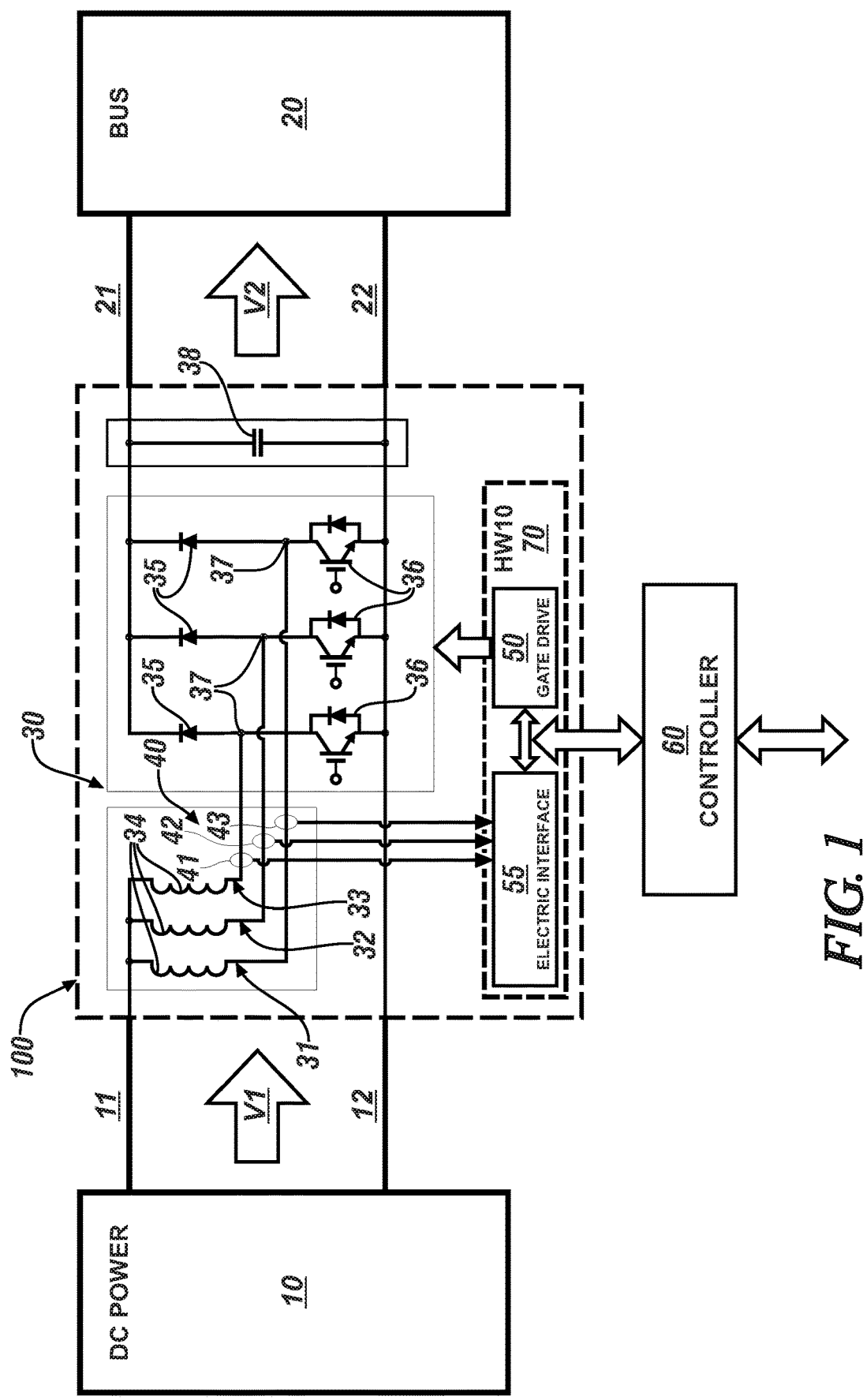
FIG. 1 schematic illustrates a multi-phase interleaved DC-DC power converter that is arranged to conduct electric power from a DC power source to a high-voltage electrical bus, in accordance with the disclosure.

Referring to the drawings, wherein like reference numerals correspond to like or similar components throughout the several Figures, FIG. 1, consistent with embodiments disclosed herein, illustrates a multi-phase interleaved DC-DC power converter 100 ('DC-DC power converter 100') that is arranged to conduct electric power from a DC power source 10 to a high-voltage electrical bus 20. The DC power source 10 supplies DC electric power at a first voltage level (V1) to an input bus that includes a positive input bus link (HV1+) 11 and a negative input bus link (HV1−) 12. The DC-DC power converter 100 converts the supplied DC electric power to electric power having a second voltage level (V2), which is supplied to the high-voltage electrical bus 20 via a positive output bus link (HV2+) 21 and a negative output bus link (HV2−) 22. The second voltage level (V2) is greater than the first voltage level (V1) in one embodiment. In one embodiment, and as shown the negative input bus link (HV1−) 12 and the negative output bus link (HV2−) 22 are electrically connected.

In one embodiment, the DC power source 10 is a fuel cell that is disposed on-vehicle, and the high-voltage electrical bus 20 is arranged to supply electrical power to one or more electrical machines, such as a traction motor, an accessory motor, etc. Alternatively, the DC power source 10 may be another electric power source, such as a capacitor, a battery, etc. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. In addition, the concepts described herein may be applied to a system in which an embodiment of the DC power source 10 and DC-DC power converter 100 are arranged to supply electrical power to one or more stationary electric machines, such as a generator.

The DC-DC power converter 100 includes a plurality of interleaved switched inductance circuits 30, a bulk capacitor 38, and software drivers and corresponding controller hardware that are disposed in an HWIO ("hardware input/output") 70 that includes a gate driver circuit 50 and an electrical interface and software processing circuit 55. The HWIO 70 includes a low-level interface and software. The plurality of interleaved switched inductance circuits 30 include, in one embodiment, a first switched inductance circuit 31, a second switched inductance circuit 32, and a third switched inductance circuit 33. Each of the first, second and third switched inductance circuits 31, 32, and 33 includes an inductor 34, a diode 35 and a power semiconductor switch 36, including one of the inductors 34 being electrically connected to a node 37 that electrically connects one of the diodes 35 and one of the power switches 36. The respective inductor 34 is arranged between HV1+ 11 and the node 37, and the respective diode 35 is arranged in series with the respective power switch 36 between HV2+ 21 and VH2− 22. One of the inductors 34 is arranged between HV1+ and the junction of the respective diode 35 in series with the respective power switch 36. Current sensors 41, 42, 43 are arranged to monitor phase currents passing through the respective node 37 of the respective first, second and third switched inductance circuits 31, 32, and 33. The DC-DC power converter 100 is operated at a fixed frequency with a preset cycle time, and the first, second and third switched inductance circuits 31, 32, and 33 are operated with offsets in phase during each cycle period. The configuration of the inductor 34, diode 35 and controlled activation and deactivation of the power switch 36 facilitates generating an output voltage that is greater than the input voltage, with output current being less than the input current due to power balancing.

Figure 2:
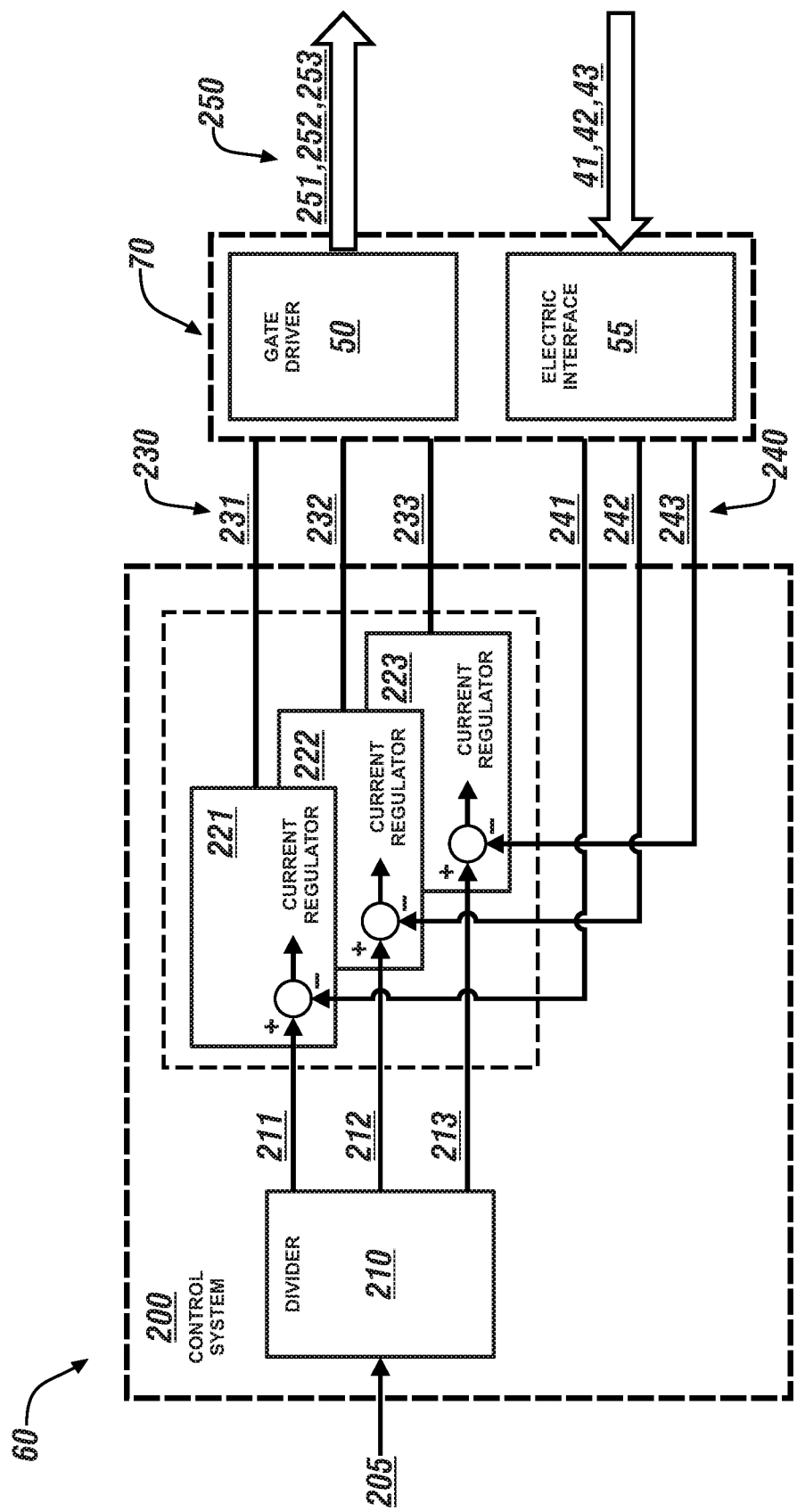
FIG. 2 schematically shows a control system to control operation of a DC-DC power converter in response to a boost input current command in accordance with the disclosure.
Figure 3:
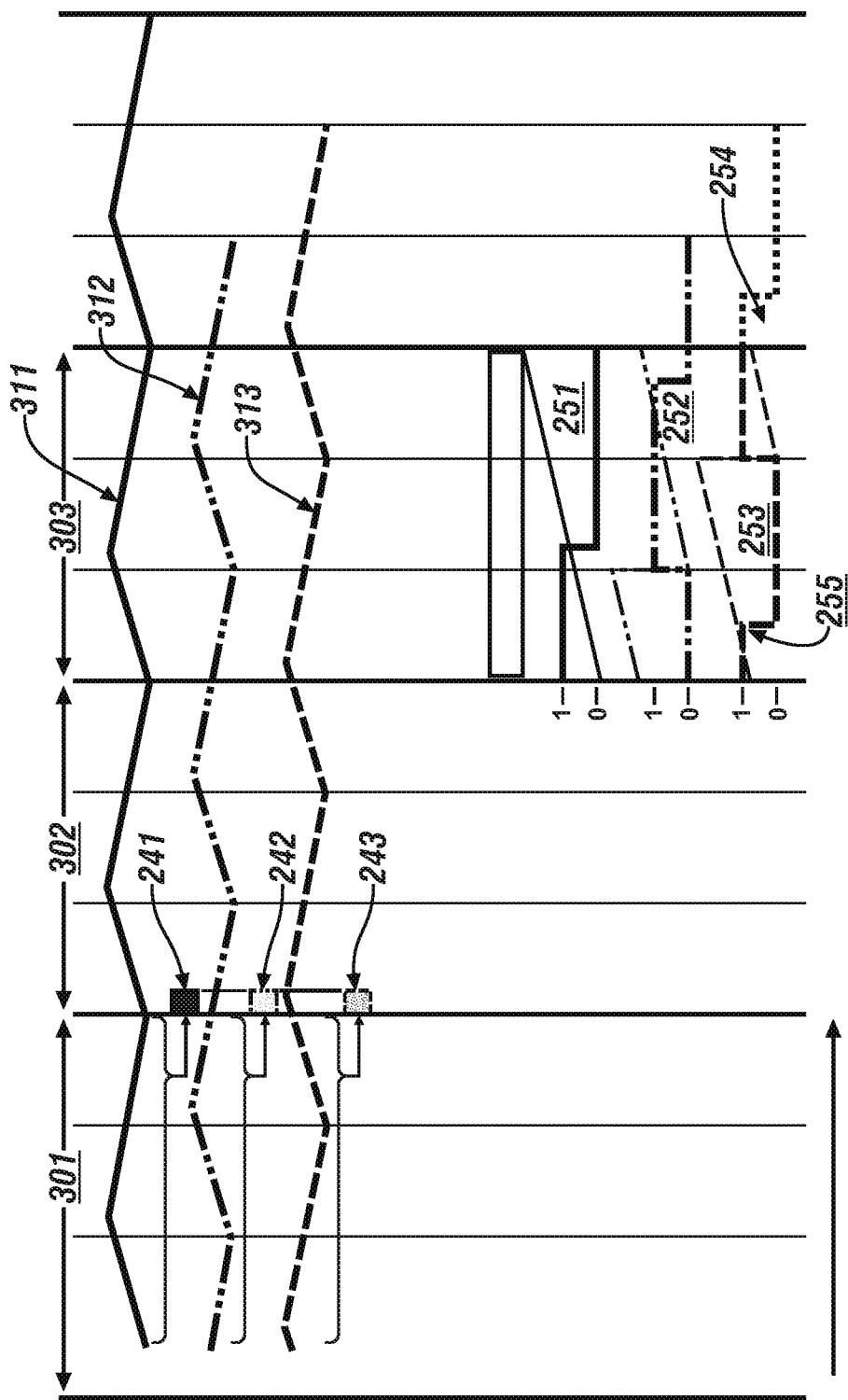
FIG. 3 graphically shows representative waveforms associated with operation of an embodiment of the multi-phase interleaved DC-DC power converter, in accordance with the disclosure.

A controller 60 is arranged to monitor signal inputs from the plurality of current sensors 41, 42, 43 and command operation of the power switches 36 of the first, second and third switched inductance circuits 31, 32, and 33 in a manner described herein with reference to FIGS. 2 and 3. The power switches 36 may include a semiconductor device such as a metal oxide semiconductor field-effect transistor (MOSFET), installed gate, bipolar transistor (IGBT), gate turn-off thyristor (GTO), or another electronic switching device, and are controllable in conducting modes (ON) and blocking modes (OFF). The DC-DC power converter 100 as illustrated is configured as a three-phase device that employs three of the switched inductance circuits 30. However, it is appreciated that another quantity of the switched inductance circuits 30 may be employed, including, e.g., two, four, or more of the switched inductance circuits 30. Design aspects of the aforementioned inductors 34, diodes 35, power switches 36, etc. are application-specific, and depend upon factors such as power demand, current flow, operating environment, etc.

The term "controller" and related terms such as control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

FIG. 2, with continued reference to FIG. 1, schematically shows an arrangement for a control system 200 that may be executed in the controller 60 to control operation of the DC-DC power converter 100 in response to a command, such as a current command in the form of a boost input current command 205. The control system 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. FIG. 3 graphically shows aspects of operation of the control system 200 that may be executed in the controller 60 to control operation of the DC-DC power converter 100 in response to the boost input current command 205.

The control system 200 includes a current command divider element 210 and first, second, and third phase current regulators 221, 222, and 223, respectively, which are associated with the respective first, second and third phases of the DC-DC power converter 100. The first, second, and third phase current regulators 221, 222, and 223 operate in conjunction with the respective first, second and third switched inductance circuits 31, 32, and 33 as switching regulators to boost voltage output and provide current to the high-voltage bus 20.

Inputs to the control system 200 include the boost input current command 205 and feedback, in the form of average currents 241, 242, 243 from the respective one of the first, second and third current sensors 41, 42, and 43. The control system 200 generates, for each cycle period, activation duty cycle commands 230 for independently operating the switched inductance circuits 30 of the DC-DC power converter 100 based upon the boost input current command 205, employing feedback from the current sensors 40. The activation commands 230 are in the form of duty-cycle commands that are determined for each cycle period, and may be phase-shifted. The activation commands 230 include forward-shifting any portion of any one of the phase-shifted duty-cycle commands that exceeds the cycle period.

The control system 200 is configured to operate the DC-DC power converter 100 at a fixed frequency, and executes at a single operating system task rate, with specific tasks being executed during sequential cycle periods. An example of sequential cycle periods are shown in FIG. 3 as a first cycle period 301, a second cycle period 302 and a third cycle period 303. Input to the control system 200 includes the boost input current command 205, which may be based upon demands for electrical current from the high-voltage bus 20, e.g., to supply electric power to a traction motor.

The boost input current command 205 is input to the current command divider element 210, which divides the boost input current command 205 to generate first, second and third current commands 211, 212, and 213, respectively, wherein the division is based upon the quantity of the interleaved switched inductance circuits 30 that are implemented in the DC-DC power converter 100. As shown, the DC-DC power converter 100 is configured as a three-phase device that employs the first, second, and third switched inductance circuits 31, 32, 33, and thus the current command divider element 210 generates a first current command 211 for controlling the first switched inductance circuit 31, a second current command 212 for controlling the second switched inductance circuit 32, and a third current command 213 for controlling the switched inductance circuit 33.

FIG. 3 graphically shows data associated with operation of an embodiment of the control system 200 that may be executed in the controller 60 to control operation of an embodiment of the DC-DC power converter 100. Results include first, second, and third raw current signals 311, 312, and 313, which are plotted in relation to time on the horizontal axis, which is separated into a first cycle period 301, a second cycle period 302 and a third cycle period 303. First, second, and third average currents 241, 242, 243, respectively, are calculated for the respective first, second, and third raw current signals 311, 312, and 313, during the first cycle period 301, and provided as feedback. Signal inputs from the first, second and third current sensors 41, 42, and 43 are monitored during each cycle period, and are shown graphically as first, second, and third raw currents 311, 312 and 313, respectively, with reference to FIG. 3.

Average first, second, and third currents 241, 242, 243 respectively, for the respective first, second and third switched inductance circuits 31, 32, 33 are determined by the electrical interface and software processing circuit 55 of the HWIO 70 for the data collected during the first cycle period 301, and provided as feedback to the respective phase current regulators 221, 222, and 223 during the second ensuing cycle period 302, with such operation shown with reference to FIG. 3.

The respective phase current regulators 221, 222, and 223 each calculates a difference between the respective first, second and third current commands 211, 212, and 213 and the associated respective first, second, and third average currents 241, 242, 243, and calculates the activation commands 230, i.e., first, second, and third activation commands 231, 232, 233 for controlling the respective first, second and third switched inductance circuits 31, 32, 33. The first, second, and third activation commands 231, 232, 233 are communicated to the gate driver circuit 50 of the HWIO 70, which determines activation commands 250, e.g., PWM ("pulsewidth-modulated") commands for controlling operation of the first, second and third switched inductance circuits 31, 32, 33 during the subsequent, third cycle period. The activation commands 250 include, in one embodiment, a first PWM command 251 for controlling activation of the first switched inductance circuit 31, a second PWM command 252 for controlling activation of the second switched inductance circuit 32, and a third PWM command 253 for controlling activation of the third switched inductance circuit 33. In one embodiment and as shown with reference to FIG. 3, the first PWM command 251 initiates at the beginning of the third cycle period 303, initiation of the second PWM command 252 is delayed by being phase-shifted by one-third of the cycle period during the third cycle period 303, and initiation of the third PWM command 253 is delayed by being phase-shifted by two-thirds of the cycle period during the third cycle period 303. Activation of the first, second, and third PWM commands 251, 252, 253 is indicated by "1", and deactivation is indicated by "0" in FIG. 3. Furthermore, the gate driver circuit 50 forward-shifts any portion of any one of the phase-shifted duty-cycle commands 251, 252, 253 that exceeds the cycle period to the beginning of the cycle period. As shown with reference to FIG. 3, this includes a portion 254 of the third PWM command 253, which exceeds the end point of the third cycle period 303 and is indicated by a dashed line. The third PWM command 253 is altered to include a second portion 255 that initiates at the beginning of the third cycle period 303.

The concepts described herein provide a method of control of a multi-phase DC-DC boost converter with interleaved, phase shifted PWM using a single operating system task rate for independent current control of each of the phases. Interleaved converter phases may not operate identically, and thus benefit from having independent regulators operating at a fast task rate. Having multiple instances of the task rate adds significant complexity to the operating system. Using a single instance of the task rate causes an unequal control delay between measured feedback and applied PWM.

The configuration of the HWIO 70 with the application layer software operates at a single fast task rate, which enables the use of same cycle period for where average current is calculated as feedback for control and for when the PWM duty cycle is applied. The PWM carrier can be phase-shifted, and applied in a unique way where the portion of the pulse that would fall in the next PWM window is shifted ahead in time, i.e., is forward-shifted and applied to the beginning of the current PWM period The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A DC-DC power converter, comprising:
   a plurality of switched inductance circuits arranged in parallel;
   a plurality of current sensors, each disposed to monitor one of the switched inductance circuits;
   a controller, in communication with each of the current sensors and operatively connected to each of the switched inductance circuits, the controller including an instruction set, the instruction set executable to:
      determine a commanded current;
      determine activation commands for the switched inductance circuits based upon the commanded current;
      execute, during a first time period, the activation commands for the switched inductance circuits and monitor current in each of the switched inductance circuits, wherein selected ones of the activation commands are phase-shifted;
      determine, during a second time period:
         an average measured current for each of the switched inductance circuits based upon the monitored current for each of the switched inductance circuits during the first time period,
         modified activation commands for the switched inductance circuits based upon the average measured current, and
         a time portion of the modified activation command for each of the switched inductance circuits that exceeds an end time point of a third time period subsequent to the second time period; and
      execute, during the third time period, the modified activation commands for the switched inductance circuits, including forward-shifting that time portion of the modified activation command for each of the switched inductance circuits that exceeds the end time point of the third time period and initiating, at a beginning time point of the third time period, that time portion of the modified activation commands that exceed the end time point of the third time period.

2. The DC-DC power converter of claim 1, wherein the controller further includes a shared current regulator arranged to command operation of each of the plurality of switched inductance circuits, wherein the shared current regulator is operable to determine, during the second time period, the modified activation commands for the switched inductance circuits based upon the average measured current.

3. The DC-DC power converter of claim 1, wherein the DC-DC power converter comprises a fixed-frequency DC-DC power converter, and wherein the first, second and third time periods comprise consecutive time periods having equivalent elapsed times.

4. The DC-DC power converter of claim 1, wherein the DC-DC power converter comprises a boost converter configured to step up a voltage level of electric power supplied from a DC power source that is connected to a high-voltage bus.

5. The DC-DC power converter of claim 1, wherein the DC-DC power converter comprises a multi-phase interleaved DC-DC power converter.

6. The DC-DC power converter of claim 1, wherein the DC-DC power converter is arranged to receive an electric power input from a DC power source at a first current level and supply electric power to a high-voltage bus at a second current level.

7. The DC-DC power converter of claim 6, wherein the DC power source comprises one of a fuel cell, an ultracapacitor, and a high-voltage DC battery.

8. The DC-DC power converter of claim 1, wherein the switched inductance circuits are arranged in parallel with a capacitor, and wherein the capacitor is arranged in parallel with first and second lines of a high-voltage DC bus.

9. The DC-DC power converter of claim 1, wherein each of the switched inductance circuits includes an inductor connected to a node in between a switch arranged in series with a diode.

10. A method for controlling a DC-DC power converter, wherein the DC-DC power converter includes a plurality of switched inductance circuits arranged in parallel, the method comprising:
    determining a commanded current;
    determining, via a controller, activation commands for the switched inductance circuits based upon the commanded current;
    executing, during a first time period, the activation commands for the switched inductance circuits and monitoring current in each of the switched inductance circuits, wherein selected ones of the activation commands are phase-shifted;

determining, during a second time period, an average measured current for each of the switched inductance circuits based upon the monitored current in each of the switched inductance circuits during the first time period;

determining, during the second time period, a modified activation command for each of the switched inductance circuits based upon the average measured current;

determining, during the second time period, a time portion of the modified activation command for each of the switched inductance circuits that exceeds an end time point of a third time period subsequent to the second time period; and executing, during the third time period, the modified activation commands for the switched inductance circuits, including forward-shifting that time portion of the modified activation command for each of the switched inductance circuits that exceeds the end time point of the third time period and initiating, at a beginning time point of the third time period, that time portion of the modified activation command that exceeds the end time point of the third time period.

11. The method of claim 10, wherein the controller includes a shared current regulator arranged to command operation of each of the plurality of switched inductance circuits; and wherein the method further comprises determining, during the second time period, modified activation commands for the switched inductance circuits based upon the average measured current.

12. The method of claim 10, wherein the DC-DC power converter comprises a fixed-frequency DC-DC power converter, and wherein the first, second and third time periods comprise consecutive time periods having equivalent elapsed times.

13. The method of claim 10, wherein the DC-DC power converter is arranged to receive an electric power input from a DC electric power source at a first current level and supply electric power to a high-voltage bus at a second current level.

14. A method for controlling a DC-DC power converter, wherein the DC-DC power converter includes a plurality of switched inductance circuits arranged in parallel, the method comprising: determining a commanded current; determining, via a controller, activation commands for the switched inductance circuits based upon the commanded current; executing, during a first time period, the activation commands for the switched inductance circuits and monitor current in each of the switched inductance circuits, wherein selected ones of the activation commands are phase-shifted; determining, during a second time period, average measured currents in each of the switched inductance circuits based upon the monitored current in each of the switched inductance circuits during the first time period; determining, during the second time period, activation commands for the switched inductance circuits based upon the average measured currents; determining, during the second time period, a time portion of the respective activation command for the switched inductance circuits that exceeds an end time point of a third time period; and executing, during the third time period, the activation commands for the switched inductance circuits, including forward-shifting that time portion of the respective activation command for the switched inductance circuits that exceeds the end time point of the third time period, including initiating, at a beginning time point of the third time period, that time portion of the activation command that exceeds the end time point of the third time period.

15. The method of claim 14, wherein the controller includes a shared current regulator arranged to command operation of each of the plurality of switched inductance circuits; and wherein the method further comprises determining, during the second time period a modified activation command for the switched inductance circuits based upon the average measured current.

16. The method of claim 14, wherein the DC-DC power converter comprises a fixed-frequency DC-DC power converter, and wherein the first, second and third time periods comprise consecutive time periods having equivalent elapsed times.

* * * * *